United States Patent [19]

Martin

[11] Patent Number: 5,701,985
[45] Date of Patent: Dec. 30, 1997

[54] FLUID FRICTION CLUTCH

[75] Inventor: Hans Martin, Stuttgart, Germany

[73] Assignee: Behr GmbH & Co., Stuttgart, Germany

[21] Appl. No.: 564,572

[22] Filed: Nov. 28, 1995

[30] Foreign Application Priority Data

Nov. 29, 1994 [DE] Germany ............... 44 42 451.5

[51] Int. Cl.$^6$ .................. F16D 35/00; F16D 43/25
[52] U.S. Cl. .................. 192/58.681; 192/58.684; 192/58.8; 192/82 T
[58] Field of Search ............... 192/58.8, 58.681, 192/58.684, 58.61, 58.7, 82 T

[56] References Cited

U.S. PATENT DOCUMENTS

| | | | |
|---|---|---|---|
| 3,642,105 | 2/1972 | Kikuchi | 192/58.8 X |
| 3,880,265 | 4/1975 | Elmer | 192/82 T X |
| 4,051,936 | 10/1977 | Crisenbery et al. | 192/58.8 X |
| 4,351,425 | 9/1982 | Bopp . | |
| 4,351,426 | 9/1982 | Bopp . | |
| 4,458,798 | 7/1984 | Bopp . | |
| 4,544,053 | 10/1985 | Yamaguchi et al. . | |
| 4,570,771 | 2/1986 | Yamaguchi et al. . | |
| 4,828,088 | 5/1989 | Mohan et al. | 192/58.8 X |
| 4,909,367 | 3/1990 | Elmer . | |
| 5,042,629 | 8/1991 | Elmer | 192/58.8 X |

FOREIGN PATENT DOCUMENTS

| | | |
|---|---|---|
| 3400396A1 | 7/1985 | Germany . |
| 3843709A1 | 7/1989 | Germany . |
| 3829322C2 | 3/1990 | Germany . |
| 3938616A1 | 5/1990 | Germany . |
| 4104928A1 | 12/1991 | Germany . |
| 4120320A1 | 1/1992 | Germany . |
| 9317085 U | 2/1994 | Germany . |

OTHER PUBLICATIONS

Partial Translation Of: Japanese Patent Laid–Open Application (Toku–Kai) No. : HEI 4 258529; Laid–Open date Sep. 14, 1992.

*Primary Examiner*—Rodney H. Bonck
*Attorney, Agent, or Firm*—Evenson McKeown Edwards & Lenahan, PLLC

[57] ABSTRACT

In a fluid friction clutch, the circulation of shearing fluid is controlled by a control of the return flow of the shearing fluid from a clutch working chamber into a clutch storage chamber. The return flow is controlled by a control piston which is movable axially of the clutch to selectively block and open a radially extending return flow duct. In certain embodiments the control piston also controls an inflow bore.

15 Claims, 3 Drawing Sheets

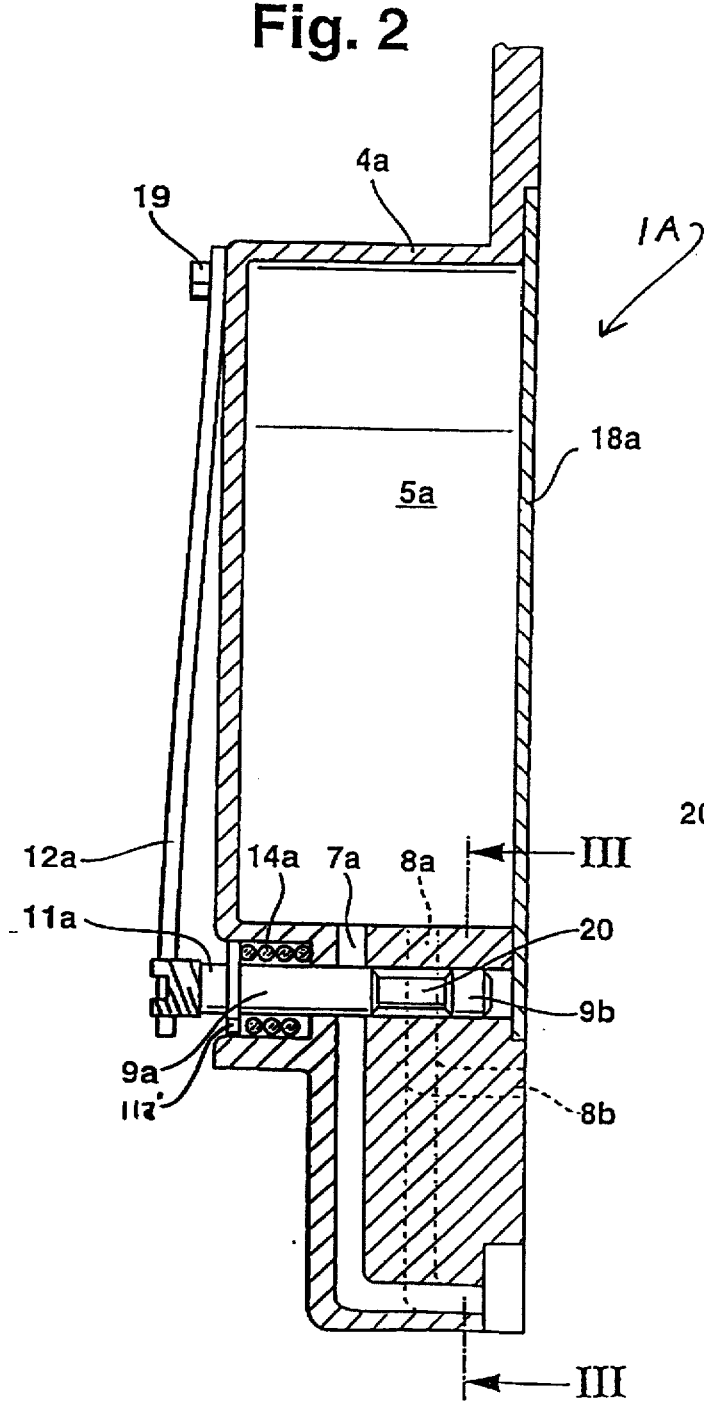
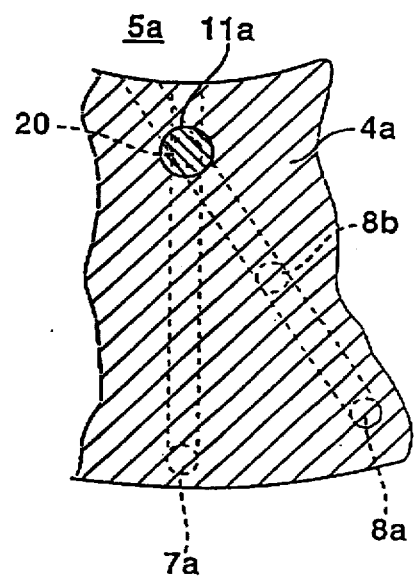

FLUID FRICTION CLUTCH

BACKGROUND AND SUMMARY OF THE INVENTION

This invention relates to a fluid friction clutch comprising a clutch disk forming a driving part and a clutch housing forming an output part, the clutch disk being surrounded by a working chamber which is connected by means of an inflow bore with a storage chamber for the shearing fluid, and, for achieving a shearing fluid circulation, a return flow bore leading from the working chamber to the storage chamber, as well as comprising devices for controlling the shearing fluid circulation.

From German Patent Document DE 38 29 322 C2, a fluid friction clutch is known for the drive of a fan for cooling motor vehicle engines in the case of which the circulation of the shearing fluid is regulated by a temperature-dependent control of the inflow of the shearing fluid into the working chamber. For the temperature-dependent control of the inflow of the shearing fluid into the working chamber, a valve lever is provided which is arranged in a housing, which valve lever closes an inflow opening and which can be lifted from the inflow opening by means of an actuating pin which can be activated by a bimetallic strip. As a function of the temperature of the coolant—the radiator exhaust air temperature being used as a control quantity—, the bimetallic strip will change and thus activate the actuating pin. As a result, shearing fluid, particularly highly viscous silicon fluid, will flow into the working chamber and produce a torque by means of its internal friction as well as by its adherence to the surfaces of the driving and the output part. By way of a return flow opening, the shearing fluid circulates between the working chamber and the storage chamber.

It is also known (Japanese Patent Document JP-HEI 4-258529), in the case of a fluid friction clutch, to regulate the inflow as well as the return flow for controlling the circulation of the shearing fluid. An electromagnetic control is provided for the inflow as well as for the return flow respectively, which electromagnetic control allows only an opening or closing of the respective inflow or return flow opening, without being able to regulate a gradual cross-sectional enlargement of the openings.

It is an object of the invention to provide a fluid friction clutch of the initially mentioned type which ensures a reliable connection of the clutch, particularly at high rotational speed differentials between the driving part and the output part.

This object is achieved according to preferred embodiments of the invention in that the control devices have a control apparatus which is assigned to the return flow bore and which can be moved continuously between a position which completely opens up the cross-section of the return flow bore and completely closes the cross-section of the return flow bore. As a result, it becomes possible to ensure a reliable connection of the fluid friction clutch at all rotational speed differentials between the driving part and the output part. By means of the complete blocking of the return flow bore, the circulation of the shearing fluid between the storage chamber and the working chamber is interrupted, whereby a defined shearing fluid quantity becomes available for the connecting, that is, for the inflow from the storage chamber into the working chamber. In contrast, in the case of the prior art, an undefined shearing fluid portion is circulating through the always open return flow bore, whereby, because of the undefined pressure conditions of static and dynamic pressure in the two chambers, no reliable connection of the clutch is ensured at relatively high rotational speed differentials between the clutch disk and the clutch housing. In contrast, by means of the invention, a secure connection is ensured also at high rotational speed differentials. This is particularly advantageous when the fluid friction clutch is used in a fan for cooling motor vehicle engines.

As a further development of the invention, a control element for the continuous opening and closing of the inflow bore which can be adjusted together with the control apparatus is assigned to the inflow bore. As a result, a further improved fluid friction clutch is achieved because the circulating shearing fluid amount can be defined still better. As a result, it is possible for the fluid friction clutch to operate with a significantly reduced circulating shearing fluid quantity.

As a further development of the invention, the control apparatus and the control element are connected with one another in one piece as piston parts of a control piston and can be continuously adjusted along a common adjusting axis transversely to the return flow bore and the inflow bore, in which case the adjusting path extends between a position blocking the return flow bore and simultaneously opening up the inflow bore by way of continuously adjustable center positions in which the return flow bore as well as the inflow bore are partially opened, and a position which opens up the return flow bore and simultaneously blocks the inflow bore. This achieves a relatively exact circulation with a defined shearing fluid quantity. This further development is particularly simple and reasonable in cost because the control apparatus and the control element are combined in a common component so that only a single control piston is required for the simultaneous control of the flow rates in both bores.

In a further development of the invention, the distance of the two piston parts with respect to one another at the level of the common adjusting axis is adapted to the distance of the inflow bore from the return flow bore. This ensures that, in the respective end positions of the control piston, either a complete blocking of the inflow bore or a complete blocking of the return flow bore is achieved. This permits a 100% connecting and disconnecting of the fluid friction clutch.

In a further development of the invention, a piston space in which the control piston can be displaced leads out into the working chamber, on its front side adjoining the piston part assigned to the inflow bore. As a result, the front side of the piston space also forms the inflow from the storage chamber into the working chamber so that the manufacturing of a high-expenditure inflow bore is avoided. The inflow bore must extend only between the storage chamber and the piston space. When the inflow bore is open, the front side of the piston space will automatically represent a portion of the inflow because, when the inflow is opened up, the shearing fluid will flow from the inflow bore into the front end of the piston space and from there into the working chamber.

In a further development of the invention, the control piston can be adjusted from an exterior side of the clutch housing. This permits an adjustment without high expenditures.

In a further development of the invention, the control piston is part of a constructional unit which can be inserted into the clutch housing from the outside. This achieves a further simplification of the producibility of the fluid friction clutch because the whole constructional unit can be adjusted separately. As a result, a test run which is required in the case of the known fluid friction clutches will not be necessary. In addition, the same constructional unit can be used in different sizes of clutches.

Other objects, advantages and novel features of the present invention will become apparent from the following detailed description of the invention when considered in conjunction with the accompanying drawings.

BRIEF DESCRIPTION OF THE DRAWINGS

FIG. 2 is an enlarged sectional representation of a part of another embodiment of a fluid friction clutch according to the invention in the area of its storage chamber in which an inflow duct and a return flow duct can be controlled by means of a common control valve;

FIG. 3 is a sectional view of the clutch part according to FIG. 2 along the section line III—III in FIG. 2.

DETAILED DESCRIPTION OF THE INVENTION

Figure 1:
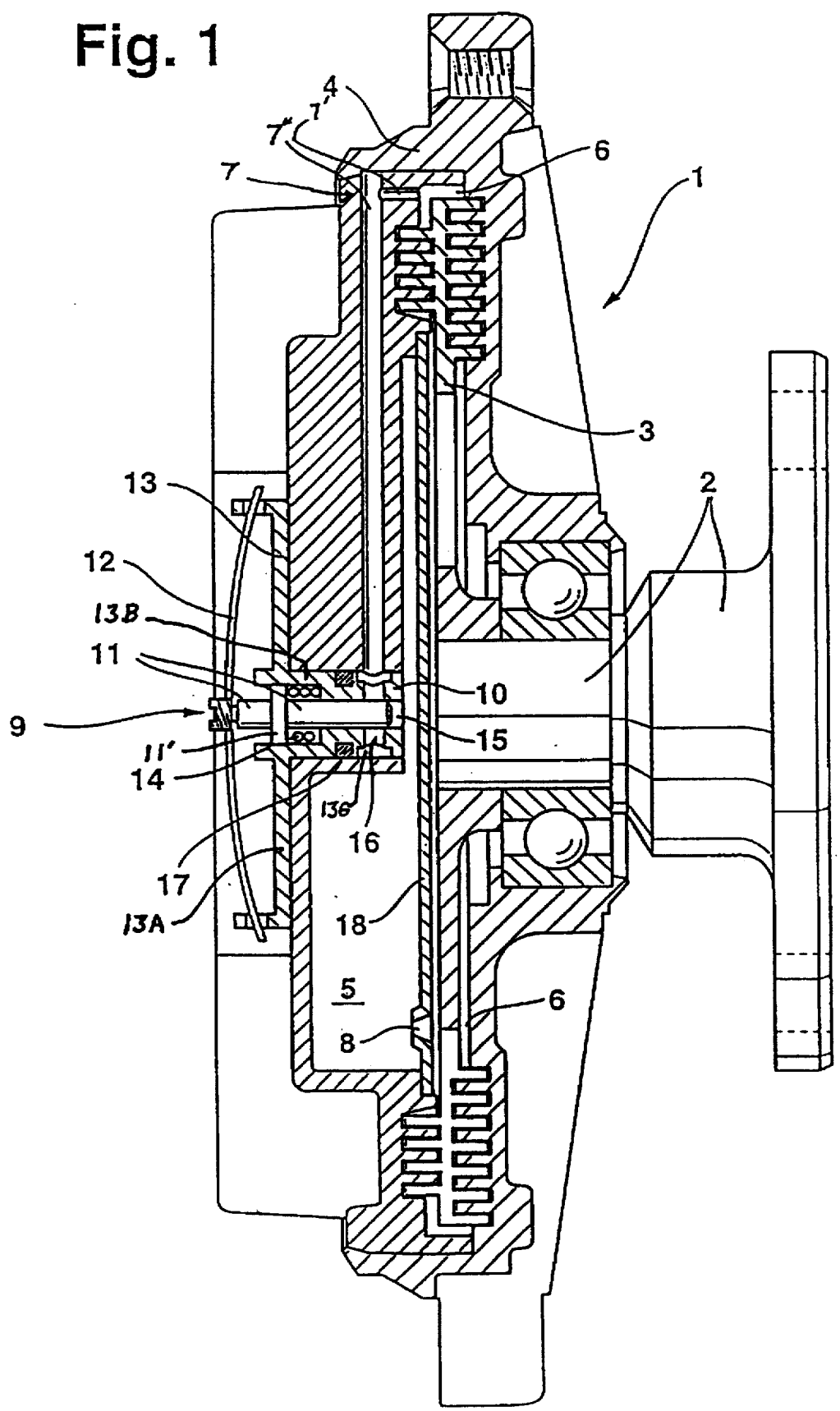
FIG. 1 is a sectional view of an embodiment of a fluid friction clutch according to the invention in which a control valve is assigned to the return flow duct.

A fluid friction clutch 1 according to FIG. 1 is used for driving a fan for the cooling of a motor vehicle engine, in which case the fluid friction clutch 1, in a manner which is not shown, is provided with a corresponding number of fan blades which are distributed along its exterior circumference. As a driving part, the fluid friction clutch 1 has a driving hub 2 which, in a known manner, is connected with a driven part of the motor vehicle engine which, in the case of the embodiment shown, is the engine crankshaft. A clutch disk 3 is non-rotatably arranged on the driving hub 2 and extends—relative to the axis of rotation of the driving hub 2—in a radial plane toward the outside. For enlarging its effective surface, the clutch disk 3, in a known manner, has comb-like profilings on its circumference. On the driving hub 2, a clutch housing 4 is disposed in a freely rotatable manner by means of a ball bearing, which clutch housing 4 surrounds the clutch disk 3 in a no-contact manner. In a manner known per se, the opposite facing sides of the clutch housing 4 are provided with cooling ribs. On a side facing away from the driving hub 2, a storage chamber 5 is provided in the clutch housing 4 in which shearing fluid in the form of highly viscous silicon oil is stored. By means of a radially extending partition 18, the storage chamber 5 is separated from the working chamber 6 in which the clutch disk 3 is arranged. On its outer circumference, the working chamber 6 has comb-like profilings which correspond to the profilings of the clutch disk 3.

In the partition 18, an inflow opening is provided in the form of an inflow bore 8 which connects the storage chamber 5 with the working chamber 6. In the embodiment shown, the inflow bore 8 is designed as a breakthrough which is conically enlarged in the direction of the working chamber 6. In embodiments which are not shown, a simple cylindrical inflow bore is provided. The inflow bore 8 is arranged in a radially exterior area of the storage chamber 5; that is, in the proximity of the exterior circumferential wall of the storage chamber 5. On a side to the inflow bore 8 which is opposite the axis of rotation of the fluid friction clutch 1, a return flow duct 7 is provided in an exterior area of the clutch housing 4, which return flow duct 7 represents a return flow bore. The return flow duct 7 has a duct section 7' which adjoins the working chamber radially above the clutch disk 3, extends in an axial manner and changes into another duct section 7" of the return flow duct 7 which extends radially toward the inside. The radial duct section 7" of the return flow duct 7 leads into the storage chamber 5.

Coaxially with respect to the axis of rotation of the clutch housing 4, a control apparatus 9 is provided in the clutch housing 4 and is assigned to the return flow duct 7. The control apparatus 9 has a bearing block 13 which is inserted into the clutch housing 4 from the front side situated opposite the clutch hub 2. The bearing block 13 has a supporting disk 13A which is supported on the outside on the clutch housing 4 and from which a bearing bolt 13B projects in one piece into the interior of the clutch housing 4. The bearing bolt 13B has a continuous stepped bore which is arranged concentrically with respect to the axis of rotation and crosses the return flow duct section 7". In addition, the bearing bolt 13B has an annular groove 13G at the level of the return flow duct section 7", from which annular groove 13G several radial breakthroughs 16 lead into the stepped bore. The outflow of returning shearing fluid from the return flow duct 7 by way of the breakthroughs 16 takes place axially by way of an outflow 15 which represents the end of the stepped bore. In the concentric stepped bore, a valve pin 11 is arranged in a linearly movable manner which is spring-elastically supported in the stepped bore by means of a coil spring 14. For this purpose, the valve pin 11 has a collar 11' with an enlarged cross-section. The bearing bolt 13B of the bearing block 13 is provided with a surrounding seal 17 which ensures a sealed snug fit of the bearing bolt 13B in the clutch housing 4. By means of an adjusting screw which is not described in detail, the valve pin 11 is held on a bimetallic strip 12 which is held under a curved prestress on its two opposite ends in an edge of the supporting disk 13A. By means of the adjusting screw, the exact position of the valve pin 11 relative to the return flow duct 7 can be adjusted.

The curvature of the bimetallic strip 12 changes in the installed condition of the fluid friction clutch 1 as a function of a radiator exhaust air temperature because the fluid friction clutch 1, including its fan blades, is arranged in the driving direction of the motor vehicle behind a radiator. By means of the radiator exhaust air temperature, the coolant temperature indirectly is the control quantity for the activating of the fluid friction clutch 1. In the condition illustrated in FIG. 1, the return flow duct section 7" is closed by means of the valve pin 11 serving as the control element. In this condition, shearing fluid flows through the inflow bore 8 into the working chamber 6, whereby a torque is transmitted to the clutch housing 4 by means of the rotating clutch disk 3. Therefore, the fluid friction clutch 1 is connected when the return flow duct 7', 7" which represents a pump duct, is closed. As soon as the bimetallic strip 12 bends more toward the outside, the valve pin 11 is pulled axially toward the outside and opens up the return flow duct section 7". As a function of the bending of the bimetallic strip 12, the return flow duct 7" in this case is opened up partially or completely. By means of ram bodies in the outermost area of the working chamber 6 which are not shown in detail, the shearing fluid is pressed through the return flow duct 7, 7', 7" and pumped from the working chamber 6. A sufficient return of the shearing fluid when the return flow duct 7 is open will also take place without any additional ram bodies because of the existing dynamic and static pressures. The diameters of the inflow bore 8 and of the return flow duct 7, 7', 7" are coordinated such that, when the return flow duct section 7" is fully open, the shearing fluid flows back faster from the working chamber 6 into the storage chamber than shearing fluid can flow again through the inflow bore back to the working chamber 6. For the operation of the fluid friction clutch 1, a relatively small amount of circulating shearing fluid will be sufficient in order to permit a wetting of the clutch disk 3 during the flow-out into the working chamber 6. By means of the control of the return flow duct, a relatively precisely definable circulation of the shearing fluid is achieved by means of which a precise connecting of the fluid friction clutch 1 is possible also at high rotational speed differentials.

The bearing block 13 represents a constructional unit which can be manufactured and adjusted independently of the clutch housing 4 and which can be used for different types of clutches. By means of the external adjustability, a test run of the fluid friction clutch 1 will not be necessary.

In the case of the fluid friction clutch 1A according to FIGS. 2 and 3, only a left housing half of a clutch housing 4a is shown. The fluid friction clutch 1A according to FIGS. 2 and 3 corresponds to the fluid friction clutch 1 according to FIG. 1 in all parts which are not shown. In the illustrated housing half of the clutch housing 4a according to FIG. 2, a storage chamber 5a is provided which is separated by means of a partition 18a from the working chamber which is not shown. In a half of the clutch housing 4a which is on the bottom in FIG. 2, a return flow duct 7a as well as an inflow duct 8a representing an inflow bore are provided, the return flow duct 7a leading into the storage chamber 5a and the inflow duct 8a branching off the storage chamber 5a into the working chamber which is not shown. The return flow duct 7a and the inflow duct 8a extend at two different radial planes at a distance to one another, the return flow duct 7a extending radially toward the outside and the inflow duct 8a extending diagonally thereto (FIG. 3). In the case of other embodiments according to the invention, the inflow duct and the return flow duct extend completely in parallel to one another. The inflow duct 8a has two alternatives for a possible leading into the working chamber, in which case the two mouth areas are shown only in the illustrations according to FIGS. 2 and 3.

In a practical embodiment, either an inflow duct 8b leads axially into the working chamber or an inflow duct 8a leads radially farther on the outside also axially into the working chamber.

The inflow duct 8a as well as the inflow duct 8b have a common crossing axis with the return flow duct 7a, along which a control piston 11a extends transversely through the two ducts; that is, through the return flow duct 7a as well as through the inflow duct 8a or 8b. For this purpose, a bore is provided in the clutch housing 4a which intersects the return flow duct 7a as well as the inflow duct 8a and in which the control piston 11a can be moved in a linear manner. The control piston 11a is inserted into the clutch housing 4a from an exterior side. The control piston 11a has two piston parts 9a and 9b, of which one piston part 9a is assigned to the return flow duct 7a as a control apparatus and the other piston part 9b is assigned as a control element to the inflow duct 8a or 8b. Like the valve pin 11 according to FIG. 1, the control piston 11a has a supporting collar 11a' by means of which it is held in the bore against the pressure force of a coil spring 14a. In the area of its exterior front end, an operating lever 12a is connected to the control piston 11a and, for the temperature-dependent control, is also made of a bimetallic strip and, on its opposite end, in an upper area of the clutch housing 4a, is rigidly connected with the clutch housing 4a at a fastening point 19. The bimetallic strip of the operating lever 12a is constructed such that, when the temperature falls, the control piston 11a is pulled toward the outside and, when the temperature rises, it is pressed toward the inside. In a central area, the cylindrical control piston 11a has a cylindrical section 20 of a smaller diameter which adjoins the two piston parts 9a, 9b of a larger diameter. The piston parts 9a, 9b serve as adjusting elements for controlling the inflow and the return flow. The axial length of the cylindrical section 20 is adapted to the spacing of the two ducts with respect to one another; that is, of the return flow duct 7a with respect to the inflow duct 8a. As a result, the spacing of the two piston parts 9a, 9b with respect to one another is also adapted to the spacing of the ducts with respect to one another. The piston part 9b is provided toward the free end of the control piston 11a as a cylindrical section of a larger diameter whose length is dimensioned such that, in a position flush with the inflow duct 8a, it completely closes off this inflow duct. According to the position of the control piston 11a as a function of the bending of the operating lever 12a, therefore either the return flow duct 7a or the inflow duct 8a are completely open or the control piston 11a is in continuously defined intermediate positions in which the return flow duct 7a as well as the inflow duct 8a are partially closed. In the position illustrated in FIG. 2, the return flow duct 7a is completely closed and the inflow duct 8a is completely open; that is, the fluid friction clutch is connected. In this embodiment therefore, in addition to the control of the return flow, the inflow of the shearing fluid can also be controlled so that a further improved precision of the connecting and disconnecting of the clutch is obtained in comparison to the embodiment according to FIG. 1.

In the embodiment illustrated in FIG. 2, the faces of the piston parts 9a, 9b are conically chamfered. However, the design of these faces of the piston parts may also be adapted to defined control characteristics in order to be able to adjust defined intermediate rotational speeds of the clutch.

In other contemplated embodiments, an electromagnetic control of the control apparatus and of the control element is provided instead of a bimetallic strip.

Figure 4:
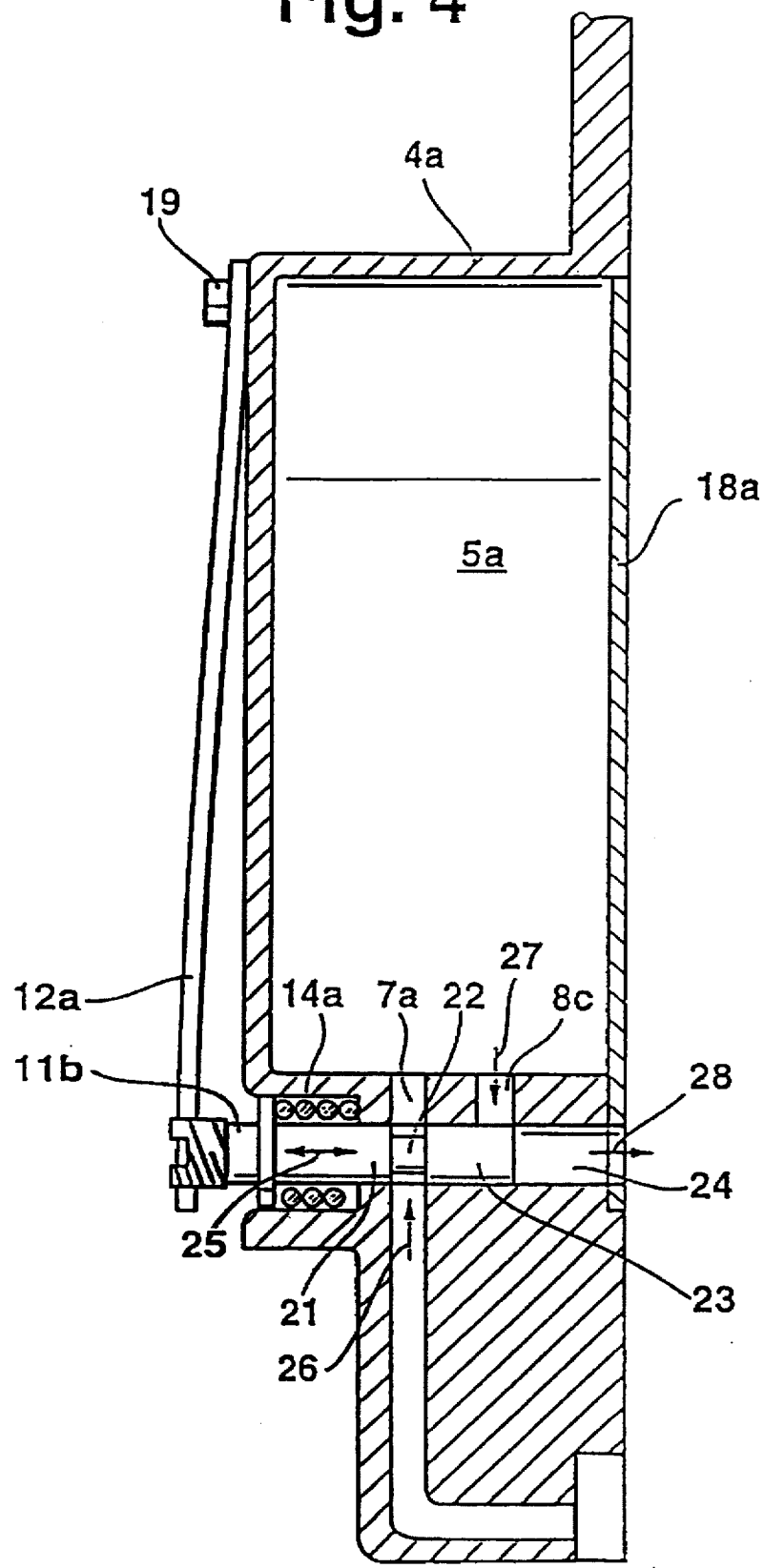
FIG. 4 is a sectional representation according to FIG. 2 of another embodiment of a fluid friction clutch according to the invention in which a piston space of a control piston leads directly into the working chamber.

The fluid friction clutch according to FIG. 4 corresponds essentially to the above-described fluid friction clutch according to FIG. 2 and 3. However, in this embodiment of the invention, a modified control piston 11b as well as a changed inflow duct 8c, 24 are provided. The control piston 11b is also used for controlling the return flow duct 7a as well as for controlling the inflow duct 8c, 24. The control piston 11b has a cylindrical piston part 21 which is adjoined by another piston part 22 of a smaller diameter. In its length, the piston part 22 corresponds to the diameter of the return flow duct 7a. The piston part 22 is adjoined by a front-side piston part 23 whose length is dimensioned such that, in the position illustrated in FIG. 4, in which the return flow duct 7a is completely open, it completely closes the inflow duct 8c, 24. As a result, a return flow of shearing fluid is permitted into the storage chamber 5a in the direction of the arrow 26. If the control piston 11b is now pulled toward the outside in the direction of the double arrow 25, the piston part 23 will gradually open up the inflow duct 8c, whereby shearing fluid flows into the transversely extending piston space 24. The piston space 24 represents the front-side end of the continuous bore for the linear mobility of the control piston 11b. The piston space 24 is open toward the working chamber, which is not shown, in which case a corresponding breakthrough is provided in the partition 18a whose diameter corresponds to that of the piston space 24. When the inflow duct 8c is open, the piston space 24 is therefore part of the inflow from the storage chamber 5a to the working chamber. This design avoids a high-expenditure laying of the inflow duct corresponding to FIGS. 2 and 3. If the inflow duct 8c is opened up, shearing fluid will flow through it in the direction of the arrow 27 into the piston space 24 and from there in the direction of the arrow 28 into the working chamber.

In all described embodiments, a circulating fluid quantity is achieved which is lower than in the prior art and by means of which lower rotational idling speeds can be achieved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Fluid friction clutch comprising:

a clutch disk forming a driving part, a clutch housing forming an output part, a working chamber surrounding the clutch disk, a shearing fluid storage chamber, an inflow bore connecting the storage chamber with the working chamber, a return flow bore leading from the working chamber to the storage chamber, and an axially movable control piston with control surfaces at its circumference movable continuously between an open position completely opening up the cross-section of the return flow bore and a closed position which completely blocks the cross-section of the return flow bore, wherein said return flow bore opens radially to the control piston and the control piston surfaces at its circumference serve to block and open said return flow bore in a simple manner without internal passages in the control piston associated with the return flow.

2. Fluid friction clutch according to claim 1, wherein a control element for the continuous opening and closing of the inflow bore is provided which is adjusted together with the control piston for the return flow bore.

3. Fluid friction clutch according to claim 1, wherein the control piston is adjustable from an exterior side of the clutch housing.

4. Fluid friction clutch according to claim 1, wherein the control piston is part of a constructional unit which can be inserted into the clutch housing from the outside.

5. Fluid friction clutch according to claim 1, wherein the control piston is acted on in use by a coolant temperature responsive bimetallic member, and wherein the bimetallic member and the control piston form parts of a constructional unit which can be preassembled separately from the clutch housing and inserted as a unit into the clutch housing.

6. Fluid friction clutch according to claim 5, wherein the clutch housing is configured to support fan blades for a vehicle engine coolant system, and wherein the clutch disk is configured to be drivingly connected to a vehicle engine output shaft.

7. Fluid friction clutch according to claim 1, wherein the clutch housing is configured to support fan blades for a vehicle engine coolant system, and wherein the clutch disk is configured to be drivingly connected to a vehicle engine output shaft.

8. Fluid friction clutch comprising:

a clutch disk forming a driving part, a clutch housing forming an output part, a working chamber surrounding the clutch disk, a shearing fluid storage chamber, an inflow bore connecting the storage chamber with the working chamber, a return flow bore leading from the working chamber to the storage chamber, and control apparatus assigned to the return flow bore which is movable continuously between an open position completely opening up the cross-section of the return flow bore and a closed position which completely blocks the cross-section of the return flow bore, and wherein a control element for the continuous opening and closing of the inflow bore is provided which is adjusted together with the control apparatus for the return flow bore, and wherein the control apparatus and the control element are configured as piston parts of a control piston which are connected with one another in one piece and can be continuously adjusted along a common adjusting axis transversely to the return flow bore and the inflow bore, the adjusting path extending between a position which blocks the return flow bore and simultaneously opens up the inflow bore by way of continuously adjustable intermediate positions in which the return flow bore as well as the inflow bore are partially opened up, and a position which opens up the return flow bore and simultaneously closes off the inflow bore.

9. Fluid friction clutch according to claim 8, wherein the spacing of the two piston parts with respect to one another at the level of the common adjusting axis is adapted to the spacing of the inflow bore with respect to the return flow bore.

10. Fluid friction clutch according to claim 9, wherein a piston space in which the control piston can be displaced, leads into the working chamber on its face adjoining the piston part assigned to the inflow bore.

11. Fluid friction clutch according to claim 10, wherein the control apparatus includes a control piston which can be adjusted from an exterior side of the clutch housing.

12. Fluid friction clutch according to claim 8, wherein the control apparatus includes a control piston which can be adjusted from an exterior side of the clutch housing.

13. Fluid friction clutch according to claim 8, wherein the control piston is part of a constructional unit which can be inserted into the clutch housing from the outside.

14. Fluid friction clutch according to claim 8, wherein the control piston is acted on in use by a coolant temperature responsive bimetallic member, and wherein the bimetallic member and the control piston form parts of a constructional unit which can be preassembled separately from the clutch housing and inserted as a unit into the clutch housing.

15. Fluid friction clutch according to claim 8, wherein the clutch housing is configured to support fan blades for a vehicle engine coolant system, and wherein the clutch disk is configured to be drivingly connected to a vehicle engine output shaft.

* * * * *